United States Patent [19]

Leith et al.

[11] Patent Number: 5,196,840
[45] Date of Patent: Mar. 23, 1993

[54] SECURE COMMUNICATIONS SYSTEM FOR REMOTELY LOCATED COMPUTERS

[75] Inventors: Victor S. Leith, Stanley; James V. Stevens, Huntersville, both of N.C.

[73] Assignee: International Business Machines Corporation, Armonk, N.Y.

[21] Appl. No.: 609,354

[22] Filed: Nov. 5, 1990

[51] Int. Cl.$^5$ .............................................. H04Q 9/00
[52] U.S. Cl. ............................. 340/825.3; 340/825.34; 380/21
[58] Field of Search ........... 340/825.3, 825.31, 825.34; 380/3, 6, 21, 23, 46, 49; 379/62, 95

[56] References Cited

U.S. PATENT DOCUMENTS

| | | | |
|---|---|---|---|
| 4,281,215 | 7/1981 | Atalla . | |
| 4,283,599 | 8/1981 | Atalla . | |
| 4,471,216 | 9/1984 | Herve | 235/380 |
| 4,590,470 | 5/1986 | Koenig | 340/825.31 |
| 4,596,898 | 6/1986 | Pemmaraju . | |
| 4,633,037 | 12/1986 | Serpell . | |
| 4,649,233 | 3/1987 | Bass et al. | 380/21 |
| 4,720,859 | 1/1988 | Aaro et al. | 380/23 |
| 4,731,841 | 3/1988 | Rosen et al. | 380/23 |
| 4,799,061 | 1/1989 | Abraham et al. | 340/825.34 |
| 4,860,352 | 8/1989 | Laurance et al. | 380/23 |
| 4,876,716 | 10/1989 | Okamoto | 380/21 |
| 4,965,568 | 10/1990 | Atalla et al. | 340/825.34 |

OTHER PUBLICATIONS

IBM Technical Disclosure Bulletin, vol. 24, No. 12, pp. 6504-6509-May 1982.

Primary Examiner—Donald J. Yusko
Assistant Examiner—Edwin C. Holloway, III
Attorney, Agent, or Firm—A. P. Tennent

[57] ABSTRACT

A system for determining when a remote computer user is authorized to communicate with a host computer and to establish a ciphering key to be used for the communications session. A random number is generated at the host computer, ciphered under the user's PIN, and sent to the remote user where it is deciphered under the PIN to provide a session key. In one embodiment, this key is reciphered under the PIN, sent to the host computer, and deciphered under the PIN. The deciphered value is equal to the generated random number when the correct PIN's are used, thereby validating the user. In another embodiment, the deciphered random number at the remote user location is used as a key to cipher the PIN which is sent to the host, deciphered under the random number, and compared with the PIN existing at the host. Subsequent, ciphering can use the determined session key as a ciphering key. Additional security can be realized by adding random digits to the PIN, masking some of the developed keys, and sending the user ID to the host in ciphered form. This system does not require a stored key in the remote computer or the transfer in the clear of the PIN between computers.

49 Claims, 6 Drawing Sheets

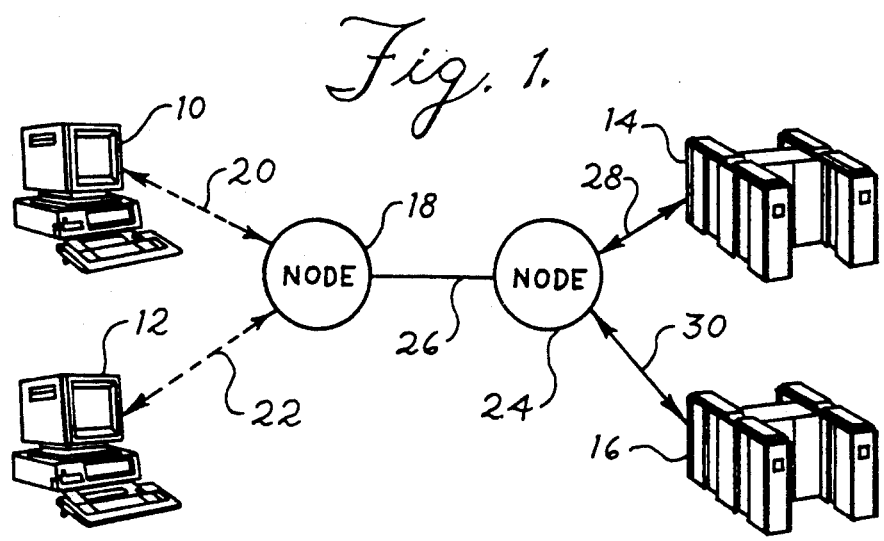
Fig. 1.
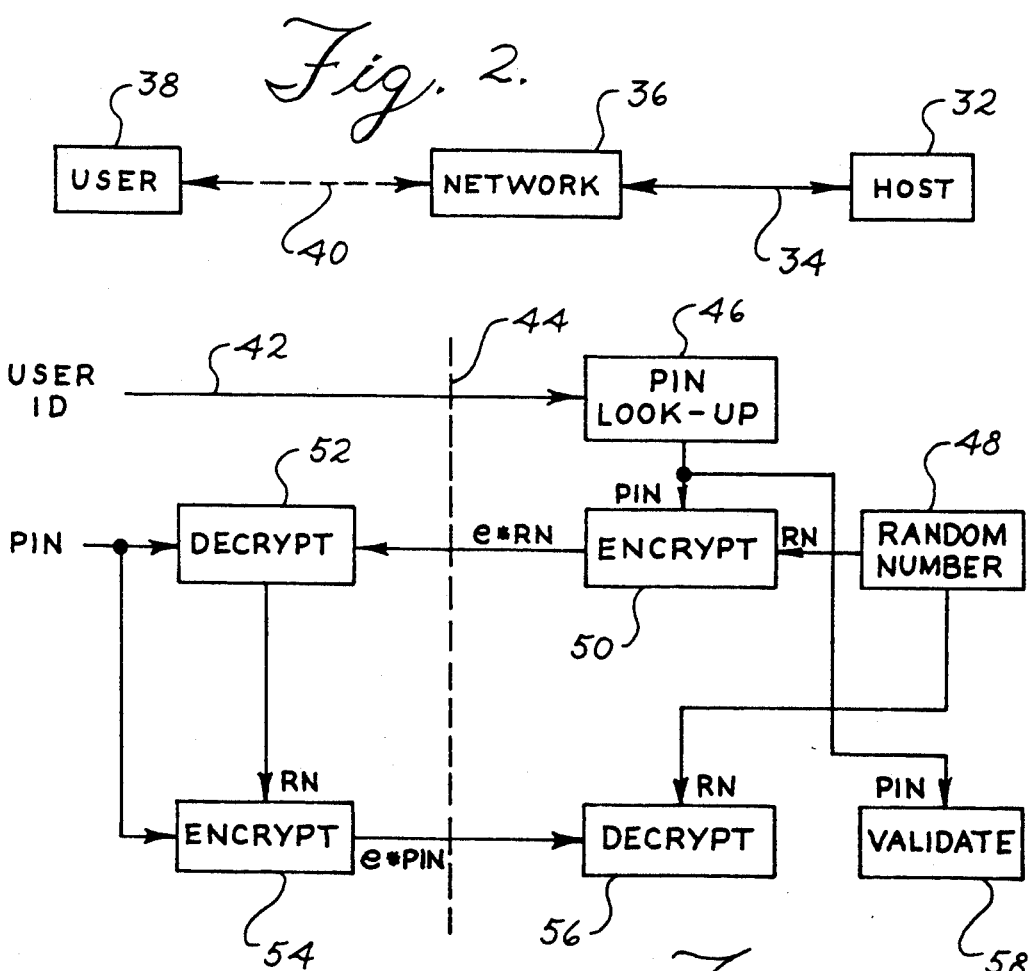
Fig. 2.
Fig. 3.

Fig. 6.
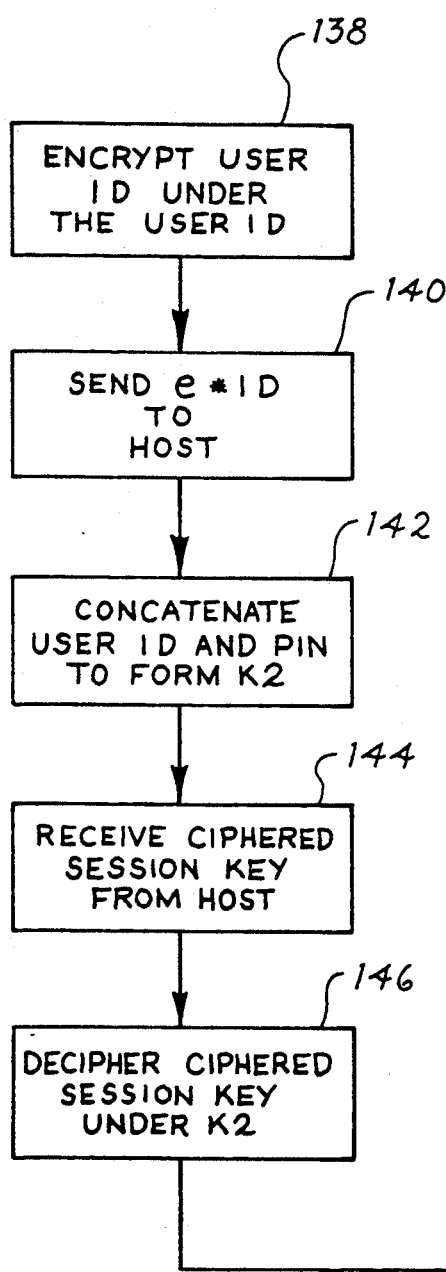
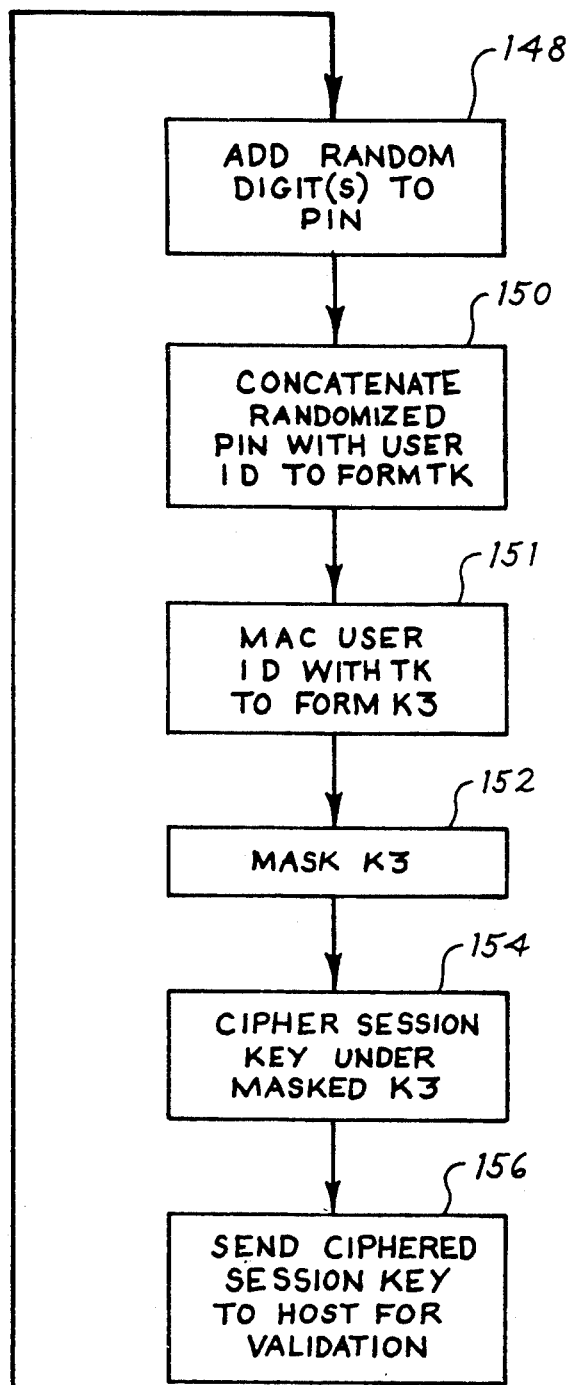

| ENTERED PIN | RANDOMNESS INFORMATION (x) | PIN WITH RANDOMNESS ADDED |
|---|---|---|
| 1764 | 0 | 1764 |
| 1764 | 1 | 1764   0,1 |
| 1764 | 2 | 1764   0-3 |
| 1764 | 3 | 1764   0-7 |
| 1764 | 5 | 1764   0-F  0,1 |

SECURE COMMUNICATIONS SYSTEM FOR REMOTELY LOCATED COMPUTERS

BACKGROUND OF THE INVENTION

1. Field of the Invention

This invention relates, in general, to computer communication systems and, more specifically, to user authorization and security in connections between remote computer users and a host computer.

2. Description Of The Prior Art

Security between communicating computer systems is important when the systems are being used in certain specific applications. Banking, brokerage, and accessing confidential information are a few of the types of applications in which fraudulent interception of the transferred data can be especially devastating to one or both of the communicating computer systems. Interception can be accomplished by tapping the communicating lines or channels and observing the transferred data between the computers. This can provide enough information to enable the interceptor to later pose as a valid user and obtain data or funds fraudulently under the name of the intercepted user. Another form of fraudulent activity involves the changing of data sent by one computer system to the other in order to alter the actual request or instructions made by the system, such as the destination and amount of a monetary withdrawal from a bank account.

Many different types of security measures are known which can lower the possibility that a particular transaction or session can be intercepted or tapped. Ciphering the data transferred between the users offers a predictable degree of indirection or difficulty to the possible interceptor, thus discouraging the fraudulent act by making a successful interception much more difficult. Another method is to use a confidential user code or personal identification number (PIN) known only by the remote user and the host computer. However, in the event the interception can determine the PIN of the user, that information is no longer secure and a fraudulent transaction under the intercepted PIN is a reality.

Validation of the user and ciphering of the transferred communications data are two methods of security which have been used in thwarting unauthorized access to and control of remote computer systems. Typically, the remote user system goes through a predefined process which establishes the user as legitimate. This usually involves the use of the PIN and possibly a user identification (ID). In such systems, it is possible that the PIN can be intercepted unless other measures, such as ciphering, are used to make the PIN less detectable in the intercepted data stream. Ciphering of the data also provides a security enhancement, but some methods of ciphering are more secure than others. A conventional and very satisfactory method of ciphering uses readily available ciphering algorithms or functions which require a ciphering key to operate on the data. Without knowledge of the key, it is virtually impossible to decipher the ciphered data. Therefore, one of the important facets of such ciphering systems is to maintain the secrecy of the ciphering key value.

Various systems have been proposed and used according to the prior art to enhance the security of communicating computer systems. Whether by authenticating the validity of the remote user or by obtaining a secret key for ciphering operations, or by a combination of both, the systems sometimes offer their advantages only in specific applications. Certain applications use physically secure remote computer systems, such as automatic teller machines (ATM's). With such devices, the security of this secret ciphering key can be maintained since access to the internal hardware and software is not possible to most people. Systems which self-destruct and erase or obliterate the key value when the system is opened are also used to protect the key value against unauthorized interception or discovery. Of particular interest in the present invention is the protection of transaction privacy and security when the remote user computer is not physically secure and the channel or communications path with the host computer is also relatively insecure. For example, this type of system occurs when a remote user uses a personal computer for home banking transactions over conventional telephone lines. The security and user validity issues considered sufficient for other types of systems are not necessarily appropriate solutions in these cases where the remote equipment can easily be accessed internally and the communications path is readily susceptible to tapping or monitoring.

Several prior art references have addressed the security issue for particular applications U.S. Pat. No. 4,799,061, issued on Jan. 17, 1989 to the same assignee as the present invention, discloses a system for authenticating components in a communications system using cryptographic techniques to determine if each has the proper key without disclosing information which would be useful to an imposter in deriving the key. The ciphering key is stored at both computer locations. While this is acceptable in applications where the remote computer is physically secure, using this type of security system with a communicating personal computer does not offer the degree of security required by a security conscious host computer operator, such as a bank. The system in the referenced patent provides for authentication of the equipment, not the user. It is desirable, and an object of the present invention, to be able to validate the authority of a user and establish a ciphering key without regard to a particular computer being used to make the transaction. This allows the user, for example, to do personal banking at home and at work on different computers without changing the procedure or authorizing numbers.

U.S. Pat. No. 4,649,233, issued on Mar. 10, 1987 to the same assignee as the present invention, discloses a system for establishing user authentication Which uses keys stored at each location and which generates a random number at each location. The system is useful when used between nodes of communications facilities wherein the equipment, and the internally stored keys, are reasonably secure and not easily tampered with or accessed by a computer hacker or fraudulent interceptor. Although this system offers significant security in specific applications, it would not provide the security and objectives desired with a remote user personal computer system.

A publication in the IBM Technical Disclosure Bulletin, Volume 24, Number 12, May, 1982, entitled "Personal Verification and Message Authentication Using Personal Keys" discloses a system whereby the user s PIN and a ciphering key value are stored on a magnetic stripe card. This helps to prevent an unauthorized user from using the system without actual possession of the card. While this system is also useful in some applications, it requires the use of a card reader and is costly for use with an ordinary personal computer.

Further background on computer data security is presented in the book "Cryptography" by Meyer and Matyas, John Wiley and Sons, Inc., 1982.

The objective of the present invention is to provide secure communications for remote users without the disadvantages associated with some of the prior art systems. A desirable feature is to transfer the user s PIN only in ciphered or encrypted form rather than in the clear. This makes it much more difficult for an unauthorized user to intercept the PIN. Another desirable feature is to not store any ciphering keys at the personal computer, both for security reasons and for versatility in allowing the user to communicate from any personal computer. Regardless of how sophisticated the encryption scheme, a stored key value is susceptible to discovery by one who has enough patience and expertise in breaking or detecting secure parameters. Still another objective is to provide a security system wherein the ciphering functions in the personal computer do not come under any difficult export restrictions. Data Encryption Standard (DES) based ciphering functions presently present restrictions as to exporting of programs which contain such functions or algorithms. Therefore, in order to make the personal computer software used in the secured communications as free from export limitations as possible, it is desirable to accomplish ciphering functions at the personal computer without using any DES algorithms which are under strict export control.

Therefore, it is desirable, and it is an object of this invention, to provide a secure communications system which is versatile, hardware unrelated, void of significant export problems, and extremely secure from the interception of data which can be fraudulently used for bogus transactions and/or for obtaining unauthorized data.

SUMMARY OF THE INVENTION

There is disclosed herein a new and useful system for use between two computers communicating with each other over an unsecure communications channel. The system provides the functions of authorizing a remote user and establishing a session ciphering key which can be used in ciphering data transferred during the session. The security, flexibility, and usefullness of the disclosed system is realized by the fact that a cipher key does not need to be stored in the remote computer, and that the confidential user code or PIN is not transferred between the systems in the clear. Additional security can be achieved by using randomness and masking information specified by the host computer system.

According to one specific embodiment of the invention, a random number is generated at the host computer system and encrypted under the PIN which is determined from the received user ID. This encrypted random number is sent to the remote user where it is decrypted under the PIN. The PIN is then encrypted under the random number and transferred back to the host computer in encrypted form. At the host computer, this quantity is decrypted under the random number and compared with the original PIN. When these values are equal, it is determined that the correct PIN has been entered and the authority of the user to communicate further with the host computer is validated. In the event of further encryptions and decryptions occurring during the session, the random number is used as the session key for the ciphering operations.

According to another embodiment of the invention, the user ID entered at the remote user location is ciphered under a one-way encrypting function and transferred to the host computer where it is used to address a look up table to determine the actual user ID and PIN. The PIN and ID are concatenated to form a first ciphering key. This key is used to cipher a number provided by a random number generator which has had masking and randomness information added to the random number. The number or signature value is sent in ciphered form back to the remote user where it is deciphered under a key formed from the user PIN and ID. The resulting signature value, or random number with added masking and randomness information, is reciphered under a masked key which has been generated from PIN and user ID information and from randomness and masking information directed by the host computer. The ciphering and deciphering functions performed at the remote user location are accomplished by Message Authentication Code (MAC) functions. The reciphered signature value is sent back to the host computer where it is decrypted or deciphered to determine if the resulting value is equal to the original signature value established by the host computer. The deciphered value depends upon a trial key used in the deciphering process. If the output value is equal to the signature value, the user is validated. If the values are not equal, other trial keys are generated within the realm of possibility of the randomness criteria to determine if the PIN entered by the user is one of the possible PIN's. If all possible keys have been tried and no match has been achieved, the users authority is rejected.

BRIEF DESCRIPTION OF THE DRAWINGS

Further advantages and uses of this invention will become more apparent when considered in view of the following detailed description and drawings, in which:

FIG. 1 is a diagram illustrating an overall communications system which can use the invention;

FIG. 2 is a block diagram of the communications system shown in FIG. 1;

FIG. 3 is a block diagram of one embodiment of the invention:

FIG. 6 is a flow chart illustrating the operation of the user portion of the embodiment shown in FIG. 5;

DETAILED DESCRIPTION OF THE PREFERRED EMBODIMENTS

Figure 4:
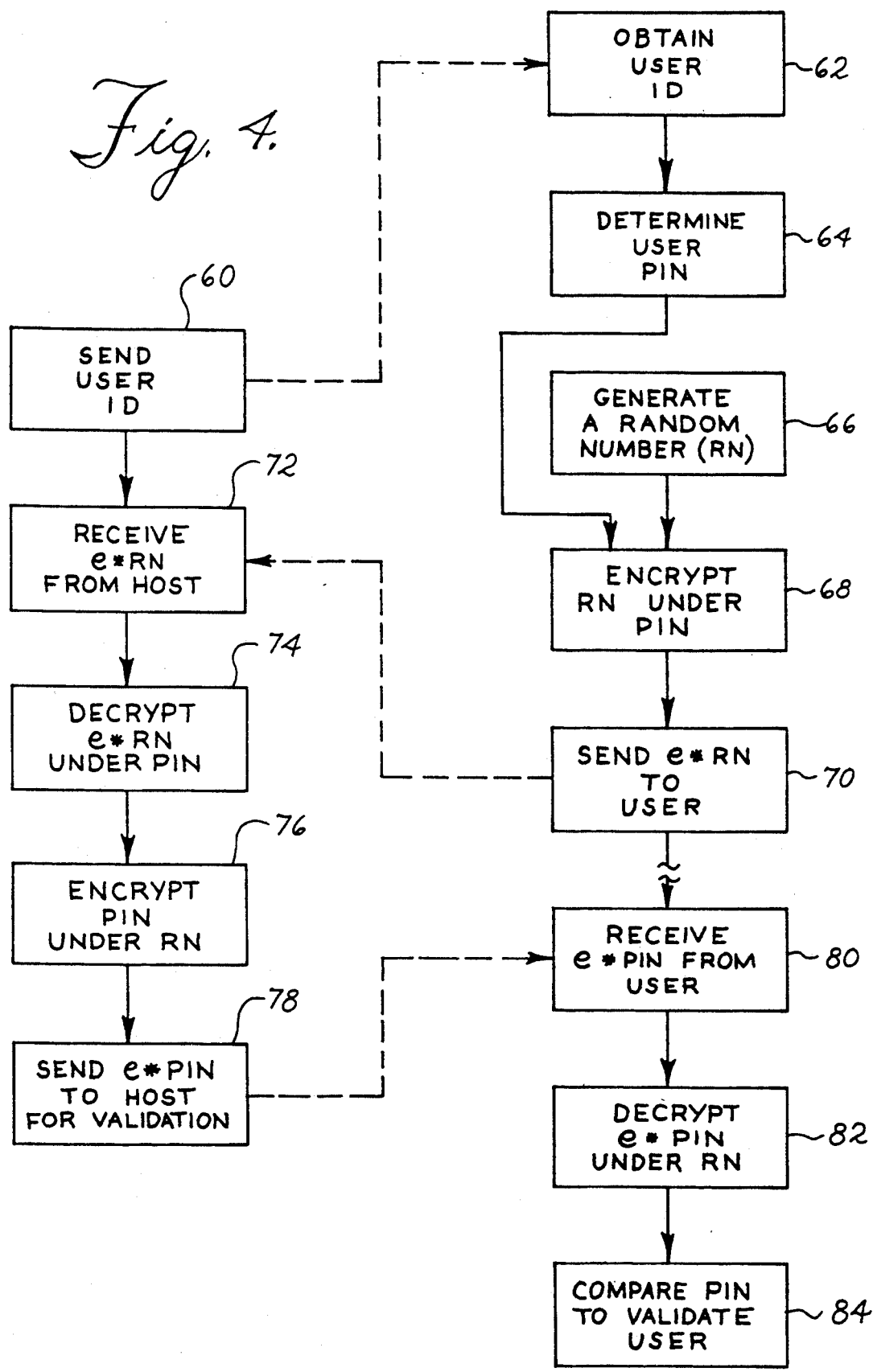
FIG. 4 is a flow chart illustrating the operation of the embodiment shown in FIG. 3.

Throughout the following description, similar reference characters refer to similar elements or members in all of the figures of the drawings.

Referring now to the drawings, and to FIG. 1 in particular, there is shown a diagram of a communications system wherein remote personal computers 10 and 12 are able to communicate with host computers 14 and 16. The personal computers 10 and 12 are connected to the node 18 through the communications lines 20 and 22, respectively. These lines typically are of an unsecured nature and may be tapped or monitored relatively easily. The nodes 18 and 24 are connected together by the communications channel or line 26 and the node 24 is connected to the host computers 14 and 16 by the lines 28 and 30, respectively. Telephone lines or communication channels 26, 28 and 30 may be relatively secure compared to the lines 20 and 22, especially when encryption devices are used on these lines. Thus, the interception of data on these lines is relatively difficult. The system in FIG. 1 illustrates only two personal computers and two host computers. However, it is within the contemplation of the invention that different numbers of computers may be used and the number of nodes through which the communicating data travels may be different from that shown in FIG. 1.

FIG. 2 is a block diagram of the communications system shown in FIG. 1. According to FIG. 2, the host computer 32 is connected through the communications channel 34 to the network 36. The network 36 provides the function of establishing a connection between the remote user 38 and the host computer 32. The user 38 is connected through the communications channel or line 40 to the network 36. The unsecure nature of the line 40, and possibly channel 34 and network 36, presents the possibility of intercepting and altering the data or falsely representing an imposter as a valid user. Of course, since the user 38 is using a personal computer in this embodiment, access directly to the computer system is also possible by a person with fraudulent intents. Since such computers communicate with each other over at least a portion of an unsecure network, security measures must be taken to make sure the user is properly and validly identified to the host computer, or vise versa, thereby eliminating the possibility of a bogus user or host communicating with the other computer system. In addition to the need for security, the security must be of a type wherein an examination of the hardware and software of the personal computer will not reveal the methods and parameters used for securing the data. It is emphasized that the secure communications system of this invention can also be used with other than personal computers.

In order to accomplish these objectives, the security system should accomplish at least two primary requirements. First, no encryption key should be stored in the personal computer. Second, a personal identification number (PIN) should not be sent in the clear between the two computer systems. FIG. 3 is a block diagram of a basic embodiment of the invention which provides these features. According to FIG. 3, the personal computer user is first identified by sending a user ID across line 42 to the host computer, which is located on the other side of the line 44 which represents the communications network and the division between the two computer systems. Devices for sending and receiving the information across the communications channel are well known and not illustrated in the Figure. According to block 46, the host computer system uses the user ID to determine the PIN of the user. This information is usually stored in memory at the location of the host computer. A random number (RN), or signature value, is generated, as indicated by block 48, and encrypted by block 50 under a key value based upon the PIN of the user. The particular size of the PIN-based key value depends upon the encryption method used and may require duplicate digits in the key when the PIN is smaller than the required key. Encryption can be by any suitable method, including that provided by Data Encryption Standard (DES) functions which are well known in the art. For example, a data encryption algorithm according to (DES) is designation by the American National Standards Institute (ANSI) as X3.92-1981.

The output from the encrypt block 50 is the encrypted random number (e*RN). This is sent back to the remote user computer (to the left of line 44) and decrypted by block 52. Decryption can also be done according to the DES algorithm. Decryption is accomplished by using a key which is based upon the user's PIN or confidential user code. Since this same number or value was used to encrypt at the host location, the result is the same random number RN generated at block 48. The PIN is encrypted at block 54 under the RN key and transferred back to the host computer system where it is decrypted by block 56 under the RN key. If the PIN's used at both locations are equal, the resulting decrypted value PIN from block 56 will equal the PIN provided by block 46. Block 58 compares the two numbers and will authenticate the user as a valid user when they are equal. Therefore, encryption and decryption are performed on the data without storing a key value at the remote user location, and without passing the PIN between the systems in the clear, or unencrypted. This allows the user to be validated and the random number, which is now available at both locations, can be used as an encryption key for further encrypting and decrypting processes during the remainder of the session. Besides offering the features indicated, the encryption key RN provided by this embodiment is valid only for the remainder of the session. This additionally enhances the security of the system since, if the key value was somehow determined, it would not be valid or useful once the current session has been terminated. A new key value is generated for each session.

FIG. 4 is a flow chart illustrating the operation of the embodiment shown in FIG. 3. Proceeding through the blocks of FIG. 4, the user ID is sent at block 60 to the host computer where it is obtained by block 62 and used at block 64 to determine the users PIN. Block 66 indicates the generation of a random number which is encrypted as indicated in block 68 under the PIN-based key determined by block 64. The encrypted random number is transferred or sent back to the remote user, as indicated by block 70. At this point, the host computer effectively waits for a response from the remote user before proceeding with the process of validating the remote user. According to block 72, the encrypted random number is received at the remote user location and decrypted, according to block 74, under a key based upon the PIN of the remote user. The PIN is entered by the remote user rather than being stored in the computer system. The next step is to encrypt the PIN under the RN, as indicated in block 76. As block 78 illustrates, the encrypted PIN is sent to the host computer system for validation. At the host, the encrypted PIN is received, as indicated in block 80, and decrypted under the RN according to block 82. A comparison is made at block 84 to determine if the PIN is equal to the PIN received and decrypted from the user. If they are equal, the user is validated and the random number can be used as a ciphering key during the remainder of the session.

Encryption and decryption, where used in this disclosure, generally refer to the changing of the data in one form to another form, according to a known algorithm or process and under the control of a key value. "Ciphering" is sometimes used synonymously with encrypting and decrypting. For clarity, ciphering, as used herein, can include encrypting or decrypting. Therefore, cipher and decipher could be either encrypt and decrypt, respectively, or decrypt and encrypt, respectively. This is so because one obtains the same result or output by first decrypting and then encrypting as when first encrypting and then decrypting. Thus, ciphering and deciphering can be referring to either encrypting and decrypting, respectively, or decrypting and encrypting respectively.

Figure 5:
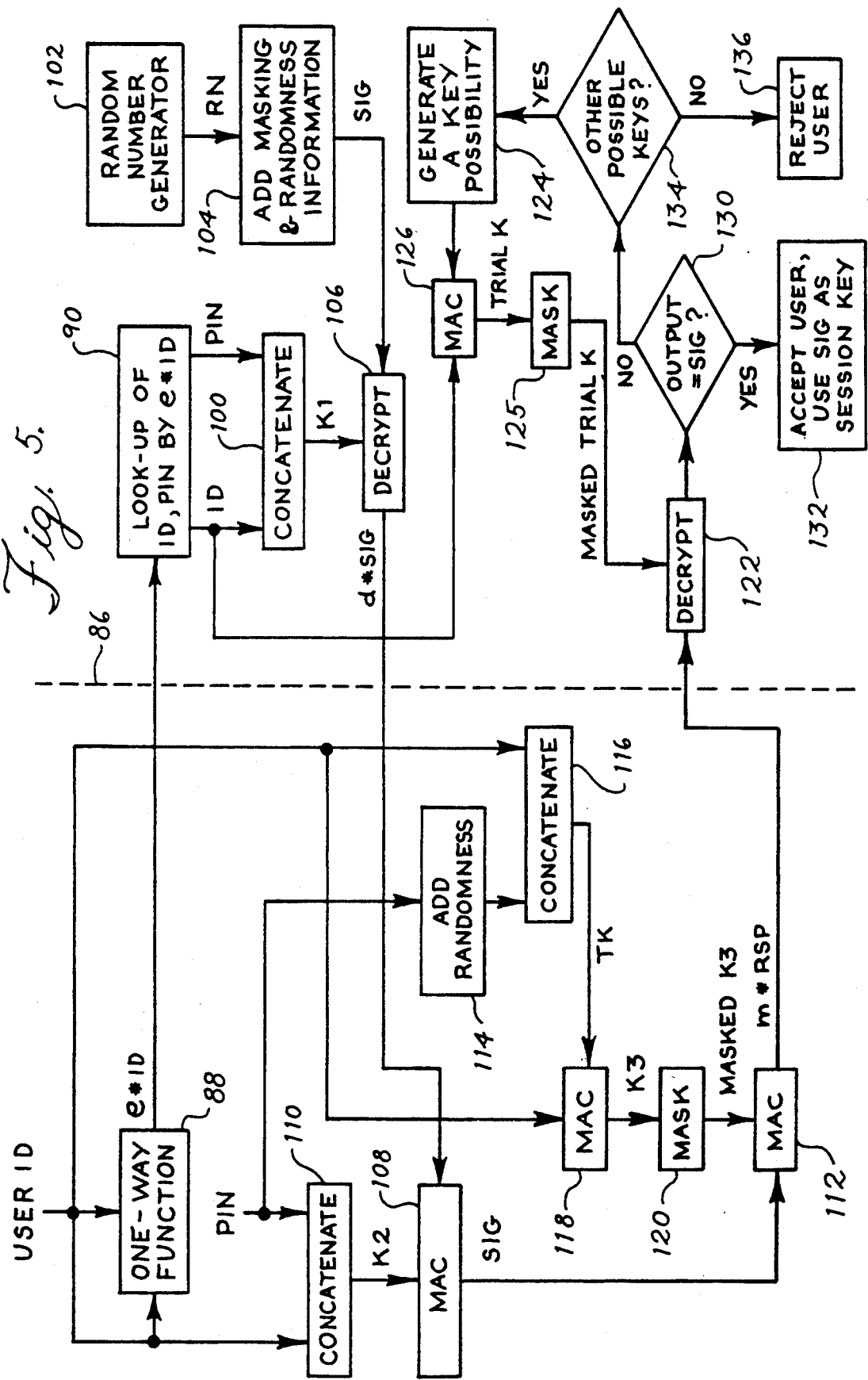
FIG. 5 is a block diagram of another specific embodiment of the invention.

FIG. 5 is a block diagram of a specific embodiment of the invention wherein additional steps are taken to secure the data between the two systems and to authenticate the validity of the remote user to use the host system or device. The functions performed by the host computer are to the right of line 86 and the functions performed at the remote user location are to the left of line 86. In order to obtain a higher degree of security compared to the previous embodiment, even the user ID is transferred between the two computer systems in encrypted form. A one-way function or irreversible encryption device 88 is used to encrypt the user ID and transfer the encrypted ID, e*ID, to the host computer. The encryption device 88 can use the standard DES algorithm with the user ID applied to both the data and key value inputs of the device 88. Using this technique makes it much more difficult for one intercepting the encrypted data to work backwards and determine the unencrypted user ID. However, since the encryption key is not known at the host computer, simple decryption under a key is not possible to determine the user ID. Instead, the host computer uses a lookup table 90 which includes data corresponding to the encrypted ID, the ID in the clear, and the corresponding PIN for the user with that ID. In other words, the encrypted ID is used to address a section of memory in a lookup table which contains the unencrypted ID and the associated PIN. This information is concatenated by block 100 to form a first key K1. The concatenation provided by block 100 combines the ID and PIN values in a known manner to produce the key K1. Obviously, many different ways to combine the ID and PIN values are possible to establish K1. However, it is important that all of the information from the PIN be included in the key K1.

The random number generator 102 generates a random number, pseudorandom number, or other non-predetermined number "RN" which is applied to the block 104 to have masking and randomness information added to RN. This produces a value which is referred to herein as a signature value "SIG". This value ultimately becomes the session key for the remainder of the secure communications session provided that the user is accepted as being valid. The masking and randomness information added to the random number is under the control of the host computer system and determines the extent of additional security added to the overall system. In certain types of transactions, the host computer may require a higher degree of security than in other types of transactions. Specific host types may require higher security than other host types. Thus, this added information allows the host computer to control the degree of security. Masking will be described elsewhere in connection with FIGS. 5 and 8. Randomness pertains to the random digits which may be added to the PIN at the remote user location, and will also be discussed in more detail in connection with FIG. 5 and with FIG. 9.

The digits representing a random number generated by the generator 102 and a certain number of digits representing the masking and randomness information. In this specific embodiment of the invention, the signature value SIG is an 8-byte quantity wherein one byte is used for masking information, one-half byte is used for randomness information, and the remaining 6½ bytes are used for the random number information.

The signature value SIG is decrypted by block 106 under the key K1. Here again, a standard DES algorithm can be used for the decryption. In addition, decryption is accomplished, at this location, prior to encryption. However, as previously discussed, this type of ciphering will eventually yield an appropriate output if the correct deciphering process is subsequently used. In other words, one can encrypt at the host and then decrypt at the user location to obtain the same value as if the quantity was first decrypted at the host and encrypted at the remote user location. Since it is desirable that the remote user location not contain a general encrypting/decrypting algorithm according to the DES algorithm, care has been taken in this embodiment to allow for another type of algorithm to be used at the remote user location to decipher the ciphered or decrypted signature value, d*SIG, which is produced by block 106.

The deciphering of the transferred data at the remote user location, or personal computer, is performed by a Message Authentication Code (MAC) function 108. The key value, K2, is derived by concatenating, at block 110, the PIN and user ID in the same manner as the block 100 concatenated similar information at the host user system. Therefore, the key K2 is equal to the key K1. Since the MAC function 108, in the specific case of an 8-byte decrypted value, performs an encryption of the data under the same key value, the resulting output of the MAC function 108 is the signature value SIG. Therefore, the ciphering and deciphering operation is performed on the signature value produced at the host computer without using a general encrypting/decrypting DES algorithm at the remote user location. It is again emphasized that, with an 8-byte quantity, the deciphering provided by the MAC function 108 is equivalent to encrypting the data produced by the block 106 at the host computer. The MAC function 108 can be produced by an algorithm defined in ANSI specification X9.9-1986, which is a national standard message authentication algorithm known by those skilled in the art.

The next function at the user location, or the personal computer, is to recipher or encrypt the signature value SIG by the MAC function 112 to produce the "macked" response m*RSP which is transferred back to the host computer. The masked key value K3 is used by the MAC function 112 to encrypt or recipher the signature value and is generated originally from the user ID and the user's PIN. Randomness is added to the user's PIN by block 114 according to the instructions and information included in the signature value received from the host computer system. Generally speaking, the randomness information indicates the degree to which random numbers are added to the PIN entered by the user before being used to establish the masked key K3. For example, the user may enter a four digit PIN and the randomness information may indicate that the computer system should include two extra digits in the random number for constructing the key K3. The advantage of this randomness will be described and explained in connection with FIGS. 8 and 9. The randomized PIN and the user ID are concatenated, according to a predetermined pattern, at block 116 to establish a temporary key TK which is used by the MAC function 118 as an encryption key. This encrypts the user ID under the key TK to provide the unmasked key K3. The MAC function 118 adds another level of indirection and increases the difficulty for anyone trying to observe the data and determine what encryption keys are used in the process, especially when no random digits are added to the PIN.

Additional indirection is added by masking the key K3 by the function 120 to obtain a masked key K3 which is used as the encryption key for the MAC function 112. The ciphered response, M*RSP, is transferred to the host computer system where it is decrypted by the decrypter 122 under a masked trial key with the hopes of producing an output equal to the signature value SIG. The decrypter 122 produces the SIG output assuming that the key used in decryption is the same as the masked key K3 used at the user location for encryption under the MAC function 112, and assuming also that the correct PIN has been entered by the user. This requires that the trial key take into consideration any other random numbers added to the PIN.

First, the block 124 contains information from the host computer concerning the user's PIN and any random digits which may be added to that PIN at the remote user location. The block 124 generates one of the key possibilities from this information and uses that as an encryption key at the MAC function 126 to encrypt the users ID. The trial key established by the MAC function 126 is masked by mask 125 with the same information or value used by the mask 120 at the user location. This produces the masked trial key which is used by the decrypter 122. Block 130 determines whether the output of the decrypter 122 is equal to the signature value SIG originally produced at the host computer at block 104. If the two values are equal, the user is accepted as being valid and the signature value SIG is used as a session key for any other encryptions and decryptions performed during the remainder of the session, as indicated by block 132. If the output does not equal the signature value, block 134 determines if other possible keys can be generated. If they can, block 124 generates another possible key and the process is continued until the output of the decrypter 122 equals the signature value for one of the possible key values. If all of the possible key values have been tried and there is no equality established between the output of decrypter 122 and the signature value, the user is rejected as indicated by block 136, and the session is terminated. Therefore, by trying all of the possible key values which could be generated by taking into consideration the randomness added to the PIN number, the host computer is able to determine if the PIN entered by the remote user is equal to the PIN assigned to that user.

FIG. 6 is a flow chart illustrating the operation of the user portion of the embodiment shown in FIG. 5. According to FIG. 6, the user ID is encrypted under the user ID, as indicated in block 138, to provide the one-way encryption function. The encrypted ID is sent to the host computer, as indicated by block 140. The remote user system then concatenates the user ID and the user's PIN to form a key K2, as indicated in block 142. After receiving the ciphered session key from the host computer, as indicated in block 144, the session key is deciphered using the key K2, as indicated in block 146.

In order to establish the next encryption key needed at the remote user location, random digits are added to the PIN entered by the user according to the randomness information received from the host computer. Block 148 represents the adding of the random digit(s) and block 150 represents the process of concatenating the randomized PIN, or confidential user code, with the user ID to form the key TK. As shown in block 151, the user ID is ciphered, or MAC'ed, with key TK to form unmasked key K3. This is masked at block 152 with the masking information supplied by the host computer and contained in the signature value SIG. The masked key K3 is used to cipher the session key SIG, according to block 154. The ciphered session key or response, RSP, is sent to the host computer for validation, as indicated by block 156. The blocks in FIG. 6 indicate the steps or functions performed during the process, not necessarily the order in which they are performed.

Figure 7:
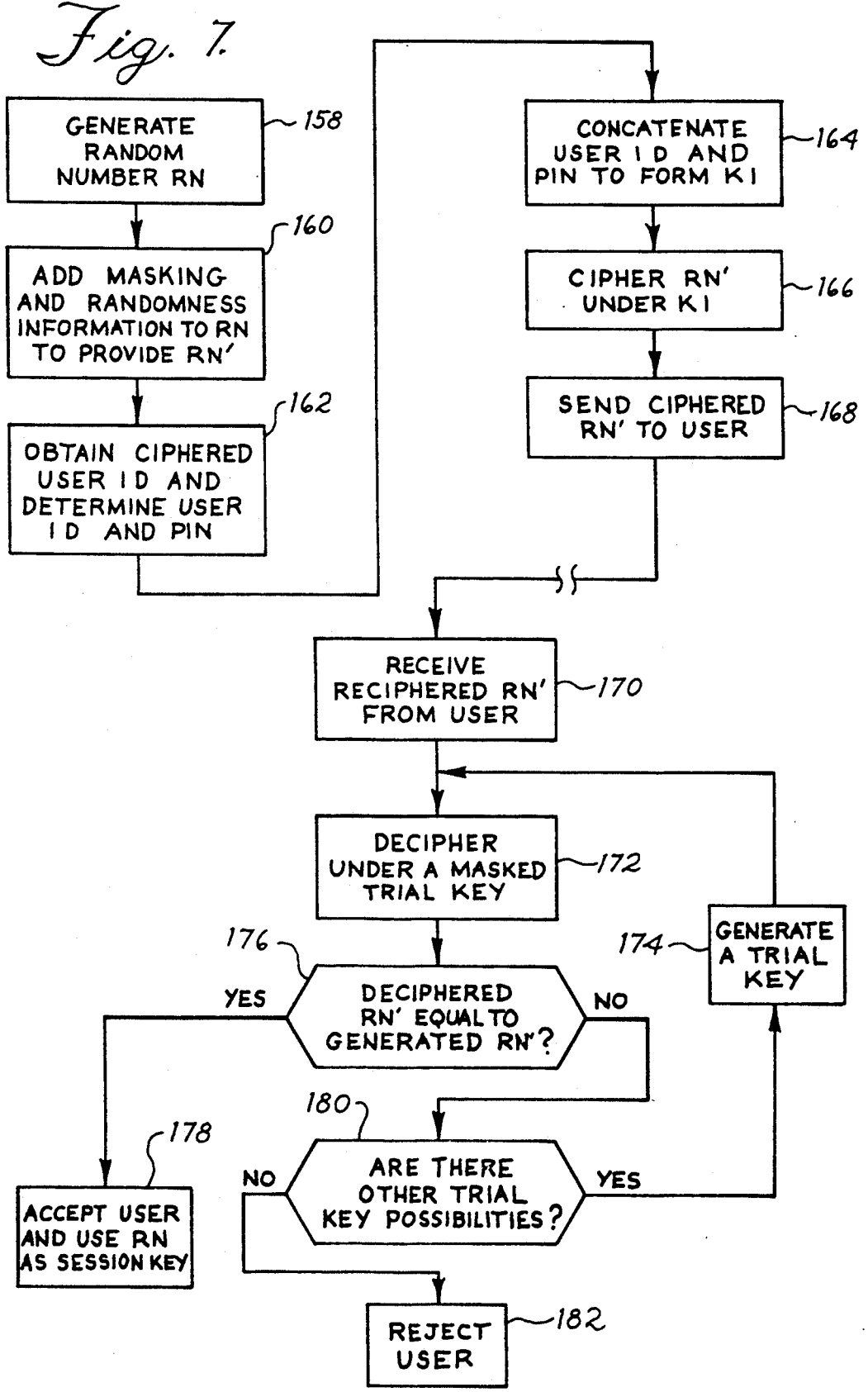
FIG. 7 is a flow chart illustrating the operation of the host portion of the embodiment shown in FIG. 7.

FIG. 7 is a flow chart illustrating the operation of the host computer portion of the embodiment shown in FIG. 5. According to FIG. 7, the random number is generated at the host as indicated in block 158. The masking and randomness information is added to the random number RN as indicated in block 160 and the user ID and PIN is obtained from the remote user system according to block 162. This information is concatenated, according to block 164, to form a key K1 which is used to cipher the random number RN' which has had the randomness and masking information added thereto, RN' is the same value as the signature value SIG indicated in FIG. 5. The ciphered random number with the added masking and randomness information is sent to the remote user system for processing, according to block 168. After processing at the remote user location, the reciphered random number, or response RSP, is received as indicated by block 170. This is deciphered under a trial key as indicated in block 172, wherein the trial key is provided by the block 174. The deciphered value is compared with the originally generated random number, with the masking and randomness information added, to determine if they are equal, as indicated in block 176. If they are equal, process flow continues to block 178 where the user is accepted and the random number RN' is used as the session key for any other ciphering and deciphering functions during the remainder of the session. If the random numbers are not equal, process flow is diverted to block 180 where it is determined if there are other trial key possibilities available depending upon the randomness information added to the random number. If so, process flow is directed to block 174 where another trial key is generated and the process repeated. If all of the trial key possibilities have already been tried, process flow is diverted to block 182 which rejects the user as invalid and terminates the session.

Figures 8, 9:
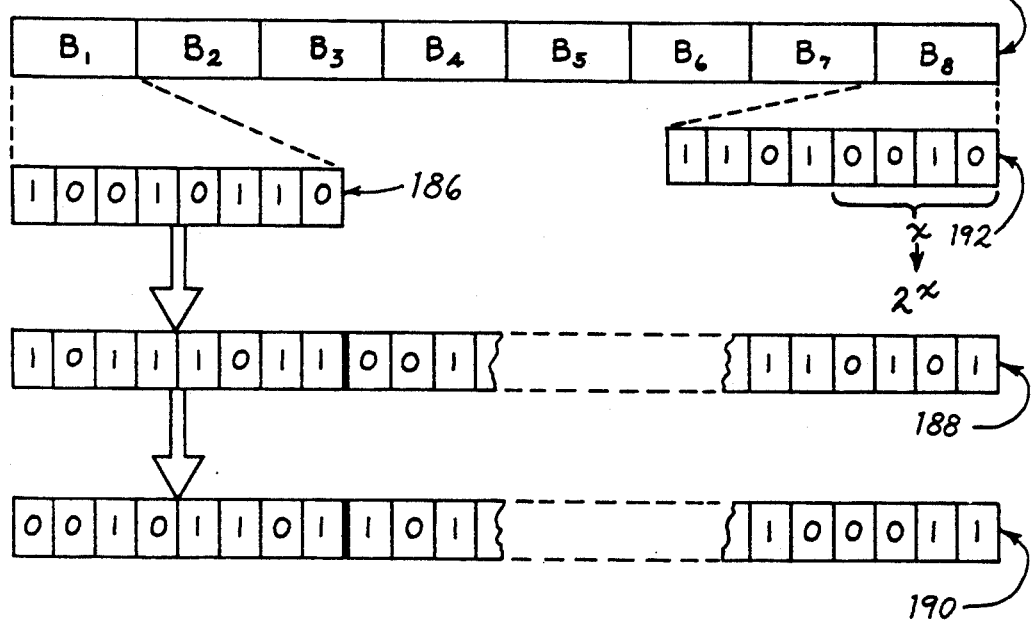
FIG. 8 illustrates the operation of the masking and randomness information used in FIG. 5.
FIG. 9 is a table illustrating examples of randomness applied to an entered PIN.

FIG. 8 is a diagram illustrating the masking and randomness functions used in the security system of FIG. 5. The 8-byte word or value 184 represents the original random number generated by the system. For illustration, the most significant byte, $B_1$, is assumed to have the binary values indicated in FIG. 8 by the byte 186. This is the masking template which will be applied to the key values to determine the masked key values. In FIG. 8. the 8-byte key value 188, shown in abbreviated form, represents a typical key value before masking is applied thereto. The masking process involves exclusive-ORing the value in byte 186 with each of the bytes in the 8-byte word 188. With the binary values indicated, the masking of the key 188 with the masking information 186 produces the masked key 190. This type of masking adds additional indirection to any attempt at determining the key values used in the security system.

Byte 192 shown in FIG. 8 is used to convey the randomness information from the host system to the remote user computer. The least significant four bits of the byte 192 are used to convey the randomness information in the form of a value of an exponent to the base number 2. In other words, the number 2 taken to the power indicated by the 4 bit-binary number in byte 192 tells the remote user system how many extra digits or numbers to add to the PIN entered by the user.

FIG. 9 is a table indicating examples of randomness applied to an entered PIN. This table further illustrates the operation and purpose of the randomness information contained in byte 192. According to FIG. 9, it is assumed that the PIN entered by the remote user is 1764, which contains four decimal digits. If the degree of randomness indicated by the 4-bit portion of byte 192 (FIG. 8) is 0, then no random digits will be added to the entered number and the resulting PIN will be 1764. In the next case where the randomness information equals the value of 1, two additional alternatives for an additional digit are possible, since $2^1 = 2$. Thus, the PIN with the randomness added would be either 17640 or 17641, as indicated in FIG. 9. In the case of a randomness information value of 2, four numbers are possible for the next digit in the PIN. This produces the combinations 17640, 17641, 17642 and 17643. The table in FIG. 9 also illustrates the possibilities for the assumed entered PIN in cases where randomness information dictates values of 3 and 5 for the exponent. In the case where the exponent is 5, thirty-two additional combinations are possible. Since each digit in the number can only be represented by sixteen values, assuming that hex notation is used, two extra digits are needed in the PIN to provide these random digits. Thus, the PIN is converted to a six-digit number wherein the last two digits can have hex values between O and F, and 0 and 1, respectively.

Increasing the user's PIN by adding random digits to the predetermined number of digits entered by the user enhances the security of the system by making it much more difficult for the PIN to be determined or calculated from intercepted data. The degree of difficulty in determining a PIN included in an intercepted data stream is dependent upon the number of calculations which must be made to look at all possible combinations. By increasing the number of possible combinations, the actual calculation time or computer time necessary to look at all the possible numbers can be increased significantly without affecting the ordinary use of the PIN. For example, adding one extra decimal digit to a four-digit PIN can increase the required computer time by a factor of ten. Having two decimal digits can increase the computer time by a factor of one hundred. Since it takes a considerable amount of time even with ordinary PIN's to perform all the calculations necessary to detect the PIN, increasing the calculation time by a factor of ten or one hundred, or by some other factor, basically extends the calculation time to a point where it would be unproductive to an intercepter to determine the PIN. Although the time required to logon as a valid user is increased slightly by adding random digits to the PIN, the actual consequence of such additional time is insignificant in relation to the overall time required to complete the transaction session. In other words, by multiplying the time needed to calculate a randomized PIN by adding digits, the calculation time can be extended from, for example, days to months, assuming typical computer speeds and calculation strategies. This extra security can be achieved at the expense of only slightly increasing the legitimate logon time and is under the control of the host system. The increase in legitimate logon time is dependent upon the randomness factor, but is always orders of magnitude less than the increase in time associated with a fraudulent attack using the same randomness factor.

The disclosure herein uses a unique session security system which functions to accomplish a specific and desirable result, and one which is particularly advantageous to secure transactions with remote personal computer users. Ciphering of data is accomplished without having a permanent key stored at the personal computer. The personal computer user's PIN is never transmitted in the clear between the computers, even before the session ciphering key is established. Additional security can be provided by ciphering the user ID without a stored key and adding random digits to the PIN.

It is emphasized that numerous changes may be made in the above-described system without departing from the teachings of the invention. For example, the system may be used without randomness and masking, or the user ID may be initially sent in the clear. Once the user's authority to communicate has been validated, the random number may or may not be used as a ciphering key for further communications during the session. It is intended that all of the matter contained in the foregoing description, or shown in the accompanying drawings, shall be interpreted as illustrative rather than limiting.

We claim as our invention:

1. A security system for validating the authority of a remote user to communicate with a host device, said system comprising:

means at the host device for storing user ID and personal identification number (PIN) information;

means for sending the ID information across a communications channel from the remote user to the host device;

means at the host device for providing a non-predetermined signature value;

means at the host device for ciphering the signature value under a first key value which is dependent upon at least a portion of the stored ID and PIN information;

means for sending the ciphered signature value across the communications channel to the remote user;

means at the remote user location for deciphering the ciphered signature value received from the host device under a second key value which is equal to said first key value and derived from the same information as said first key value;

means at the remote user location for ciphering the deciphered signature value under a third key value and for sending the ciphered signature value to the host device; and validation means at the host device for deciphering the ciphered signature value received from the remote user location and for determining if the deciphered signature value is equal to the signature value originally provided by the host device.

2. The security system of claim 1 wherein the means at the remote user location for ciphering the deciphered signature value includes means for forming the third key value based upon at least a portion of ID and PIN information obtainable at the remote user location.

3. The security system of claim 1 wherein the signature value providing means comprises:
   means at the host device for generating a random or pseudorandom number; and
   means at the host device for adding masking and additional randomness information to the generated random or pseudorandom number to provide the signature value.

4. The security system of claim 3 wherein additional randomness information added to the generated random or pseudorandom number by the masking and additional randomness information means includes specifications for the inclusion of additional digits to the PIN at the remote user location.

5. The security system of claim 1 wherein an ID ciphering means is included at the remote user location for ciphering the user ID information before it is sent to the host device.

6. The security system of claim 5 wherein the ID ciphering means performs a one-way encryption of the ID before it is sent to the host device.

7. The security system of claim 5 wherein the storage means at the host device for storing the ID and PIN information is a look-up table (LUT), and the ID and PIN information is retrieved from the LUT by using the encrypted ID to identify a position in the LUT which contains corresponding and unencrypted ID and PIN information.

8. The security system of claim 1 wherein the signature value ciphering means at the host device includes means for forming the first key value by concatenation of the user ID and PIN information at the host device.

9. The security system of claim 1 wherein the signature value deciphering means at the remote user location includes means for forming the second key value by concatenation of the user ID and PIN information at the host device.

10. The security system of claim 1 wherein the deciphering means which functions with the second key value and the ciphering means which functions with the third key value perform Message Authentication Code (MAC) operations on the data processed by said means.

11. The security system of claim 3 wherein the signature value ciphering means at the remote user location includes means for forming the third key value from concatenated ID and PIN information which is masked according to the masking information contained in the signature value received from the host device.

12. The security system of claim 4 wherein the validation means includes means for deciphering the ciphered signature value under a fourth key value which is generated as a function of the ID and PIN information.

13. The security system of claim 12 further comprising means at the remote user location for creating modified PIN information based on randomness information incorporated into the signature value by the masking and randomness information means, the modified PIN information having at least one random digit incorporated therein in addition to the PIN information.

14. The security system of claim 13 wherein the validation means at the host device tests all of the possible combinations of the fourth key value for an equality in the signature values before rejecting a user as invalid.

15. The security system of claim 13 further comprising means at the remote user location for creating modified PIN information based upon masking information incorporated into the signature value by the masking and randomness information means.

16. A security system for validating the authority of a remote user to communicate with a host device, said system comprising:
   means at the host device for storing user ID and personal identification number (PIN) information;
   means at the host device for receiving ciphered user ID information and locating the corresponding user ID and PIN information in the storing means;
   means at the host device for providing a random number;
   means at the host device for adding randomness and masking information to the random number to provide a signature value, said randomness information specifying the degree of random digits to be added to the PIN at the location of the remote user and said masking information specifying a mask for processing a key value at the remote user location;
   means at the host device for ciphering the signature value under a first key value which is dependent upon a combination of the stored user ID and PIN information;
   means for sending the ciphered signature value across a communications channel to the remote user;
   means at the remote user location for deciphering the ciphered signature value received from the host device under a second key value which is equal to said first key value and derived from similar information as said first key value, said deciphering being accomplished with a Message Authentication Code (MAC) function;
   means at the remote user location for creating modified PIN information based on randomness information incorporated into the signature value by the masking and randomness information means, the modified PIN information having at least one random digit incorporated therein in addition to the PIN information;
   means at the remote user location for ciphering the signature value with a MAC function under a third key value, said third key value being formed from a concatenated combination of the user ID and the PIN;
   means at the remote user location for creating modified PIN information based upon masking information incorporated into the signature value by the masking and randomness information means;
   means for sending the ciphered signature value to the host device;
   means at the host device for deciphering the ciphered signature value received from the remote user location under a fourth key having a plurality of possible values, with the number of possible values being dependent upon the degree of randomness applied to the PIN at the remote user location; and
   means for comparing the provided and deciphered-reciphered signature values to determine is they are equal when using one of the possible fourth key values for deciphering and, if an equality is determined, validating the authority of the user to communicate with the host device and using the signature value existing at both locations as a ciphering session key for the remainder of the communications session.

17. A method of establishing a common ciphering key at two different communicating locations, said method including the steps of:

generating a non-predetermined number at a first of said locations which is used to establish a session key at the location;

ciphering the session key at said first location under a first key dependent at least upon a confidential user code known at said first location:

transferring the ciphered session key to the second location;

deciphering the ciphered session key under a second key which is dependent at least upon said confidential user code which is also known at said second location;

reciphering the session key at the second location under a third key dependent at least upon the confidential user code known at said second location;

transferring the reciphered session key to the first location:

deciphering the reciphered session key under a fourth key dependent at least upon said confidential user code known at said first location; and comparing the deciphered session key at the first location with the established session key at the same location and, when they are equal, using the session key existing at both locations as a common ciphering key in any subsequent ciphering functions during the remainder of the session.

18. The ciphering key establishing method of claim 17 including the step of
(a) applying masking and randomness information to the generated session key at the first location, said randomness information specifying the addition of one or more random digits to the confidential user code which influences the third key at the second location; and
(b) creating modified PIN information at the remote user location based on randomness information incorporated into the signature value by the masking and randomness information means, the modified PIN information having at least one random digit incorporated therein in addition to the PIN information.

19. The ciphering key establishing method of claim 18 including the step of transferring user ID information from the second location to the first location.

20. The ciphering key establishing method of claim 19 wherein the transferred user ID information is in ciphered form.

21. The ciphering key establishing method of claim 20 wherein the user ID is ciphered with a one-way ciphering means.

22. The ciphering key establishing method of claim 21 including the step of addressing a look-up table according to the received ciphered user ID to ascertain a non-ciphered user ID and confidential user code.

23. The ciphering key establishing method of claim 22 including the step of concatenating the user ID and the confidential user code to form the first key.

24. The ciphering key establishing method of claim 22 including the step of concatenating a user ID and the confidential user code to form the second key.

25. The ciphering key establishing method of claim 19 including the step of adding at least one random digit to the confidential user code in the formation of the third key to produce a randomized confidential user code according to the randomness information included in the generated session key established at the first location.

26. The ciphering key establishing method of claim 20 including the step of concatenating the randomized confidential user code with the user ID in the formation of the third key.

27. The ciphering key establishing method of claim 26 including the step of masking the result of the concatenation according to the masking information included in the generated session key established at the first location.

28. The ciphering key establishing method of claim 19 including the step of forming the fourth key from a combination of the user ID and the confidential user code with the possible one or more random digits added.

29. The ciphering key establishing method of claim 28 including the step of masking the value used to form the fourth key according to the masking information included in the generated session key established at the first location.

30. The ciphering key establishing method of claim 25 including the step of forming additional fourth keys dependent upon at least all possible values of the randomized confidential user code.

31. A method of establishing a common ciphering key at two different communicating locations, said method including the steps of:

generating a random number at a first of said locations;

adding masking and randomness information to the random number to establish a session key at said first location;

ciphering an ID at the second location and sending the ciphered ID to the first location;

locating a corresponding ID and confidential user code in storage at the first location by using the ciphered ID received from the second location;

ciphering the session key at said first location under a first key dependent upon the located ID and confidential user code;

transferring the ciphered session key to the second location;

deciphering the ciphered session key at the second location with a Message Authentication Code (MAC) function under a second key which is dependent upon said ID and confidential user code which is also known at said second location;

creating a randomized confidential user code at said second location which includes generating and adding at least one additional digit to the confidential user code;

reciphering the session key with a MAC function at the second location under a third key dependent upon the ID and the randomized confidential user code;

transferring the reciphered session key to the first location;

deciphering the reciphered session key under a fourth key having a plurality of possible values, said values being dependent, at least in part, upon said confidential user code known at said first location and the degree of randomness specified in the established session key; and comparing the deciphered session key at the first location with the established session key at the same location and, when there is an equality under one of the possible fourth keys, using the session key existing at both locations as a common ciphering key in any subsequent ciphering functions during the remainder of the session.

32. A method for a remote user to establish secure communications with a host device, said method including the steps of:
receiving a ciphered session key from the host device;
deciphering the ciphered session key to provide a session key, said deciphering being under a key formed from at least a confidential user code known by the remote user;
reciphering the session key under another key formed from at least the confidential user code; and
sending the reciphered session key to the host device for validation.

33. The secure communications method of claim 32 including the step of using the deciphered session key for subsequent ciphering functions by the remote user during the remainder of the session.

34. The secure communications method of claim 32 wherein the deciphering and reciphering steps are accomplished by using by Message Authentication Code (MAC) functions.

35. The secure communications method of claim 32 including the step of generating and adding at least one random digit to the confidential user code before forming said other key.

36. The secure communications method of claim 35 including the step of concatenating the randomized confidential user code with a user ID to form said other key.

37. The secure communications method of claim 35 including the step of ciphering a user ID with a one-way ciphering function and sending the ciphered user ID to the host device.

38. The secure communications method of claim 36 including the additional step of masking the concatenated combination of the randomized confidential user code and the user ID according to a predetermined masking criteria.

39. A method for a remote user to establish secure communications with a host device, said method including the steps of:
ciphering a user ID according to a one-way ciphering function;
sending the ciphered user ID to the host device;
receiving a ciphered session key from the host device;
deciphering the ciphered session key using a Message Authentication Code (MAC) function to provide a session key, confidential user code which is also known at said second location;
creating a randomized confidential user code at said second location which includes generating and adding at least one additional digit to the confidential user code;
reciphering the session key with a MAC function at the second location under a third key dependent upon the ID and the randomized confidential user code;
transferring the reciphered session key to the first location;
deciphering the reciphered session key under a fourth key having a plurality of possible values, said values being dependent, at least in part, upon said confidential user code known at said first location and the degree of randomness specified in the established session key; and
comparing the deciphered session key at the first location with the established session key at the same location and, when there is an equality under one of the possible fourth keys, using the session key existing at both locations as a common ciphering key in any subsequent ciphering functions during the remainder of the session.

40. A method for a host device to establish secure communications with a remote user, said method including the steps of:
generating a non-predetermined number which is used in forming a session key for the secure communications;
ciphering the session key under a key which is formed from at least a confidential user code for the remote user, said user code being known by the host device;
sending the ciphered session key to the remote user for processing;
receiving a reciphered session key from the remote user;
deciphering the reciphered session key under another key formed from at least said confidential user code known by the host device; and
determining if the formed and the deciphered-reciphered session key are equal.

41. The secure communications method of claim 40 including the step of using the formed session key for subsequent ciphering functions during the remainder of the session when the formed and the deciphered-reciphered session keys are determined to be equal.

42. The secure communications method of claim 40 including the steps of
(a) adding randomness and masking information to the number before forming the session key, said information defining to the remote user parameters for forming a ciphering key; and
(b) creating a confidential user code which includes generating and adding at least one additional digit to the confidential user code.

43. The secure communications method of claim 40 including the steps of receiving a ciphered user ID from the remote user and locating a corresponding user ID and confidential user code stored in memory at the host device.

44. The secure communications method of claim 43 including the steps of concatenating the user ID and the confidential user code to form the key which is used to cipher the session key.

45. The secure communications method of claim 40 wherein the step of determining if the formed and the deciphered-reciphered session keys are equal includes the additional step of generating a plurality of possible trial keys used in deciphering the reciphered session key, with the number of possible trial keys being dependent upon the random information added to the generated number.

46. The secure communications method of claim 45 including the step of masking the trial keys according to a predetermined masking criteria.

47. A method for a host device to establish secure communications with a remote user, said method including the steps of:
generating a random number;
adding randomness and masking information to the random number to form a session key for the secure communications, said information defining to the remote user parameters for forming a ciphering key;

receiving a ciphered user ID from the remote user and locating a corresponding user ID and confidential user code stored in memory at the host device;

ciphering the session key under a key which is formed from at least the confidential user code and the user ID for the remote user;

sending the ciphered session key to the remote user for processing said ciphered session key into a reciphered session key dependent in part upon said randomness and masking information;

receiving the reciphered session key from the remote user;

generating a plurality of possible trial keys to decipher the reciphered session key, said trail keys being dependent at least upon the confidential user code known by the host device, and with the number of possible trial keys being dependent upon the random information added to the generated random number;

deciphering the reciphered session key under a trial key;

determining if the formed and the deciphered-reciphered session key are equal for one of the possible trial keys; and if an equality exists, using the formed session key for subsequent ciphering functions at the host device during the remainder of the session.

48. A security system for validating the authority of a remote user to communicate with a host device, said system comprising:

means at the host device for storing user ID and personal identification number (PIN) information;

means at the host device for providing a non-predetermined random number;

means at the host device for ciphering the random number under a first key value which is dependent upon at least a portion of the stored ID and PIN information:

means for sending the ciphered random number across a communications channel to the remote user:

means at the remote user location for deciphering the ciphered random number received from the host device under a second key value which is equal to said first key value and derived from the same information as said first key value;

means at the remote user location for ciphering at least the PIN under the deciphered random number and for sending the ciphered PIN to the host device; and validation means at the host device for deciphering, under the random number, the ciphered PIN received from the remote user location and for determining if the deciphered PIN is equal to the PIN stored at the host device for the corresponding user ID.

49. A method of establishing a common ciphering key at two different communicating locations, said method including the steps of:

generating a non-predetermined number at a first of said locations which is used to establish a session key at that location;

ciphering the session key at said first location under a first key dependent at least upon a confidential user code known at said first location;

transferring the ciphered session key to the second location:

deciphering the ciphered session key under a second key which is dependent at least upon said confidential user code which is also known at said second location;

ciphering the confidential user code at the second location under a key dependent upon the session key available at said second location:

transferring the ciphered confidential user code to the first location;

deciphering the ciphered confidential user code under the established session key known at said first location; and comparing the deciphered confidential user code at the first location with the stored confidential user code at the same location and, when they are equal, using the session key existing at both locations as a common ciphering key in any subsequent ciphering functions during the remainder of the session.

* * * * *